United States Patent [19]

Huser

[11] Patent Number: 4,856,349

[45] Date of Patent: Aug. 15, 1989

[54] PROCESS AND DEVICE FOR MEASURING THE DRAW-IN FORCE AT THE INTERFACE BETWEEN A TOOL AND THE SPINDLE END OF A MACHINE TOOL

[76] Inventor: Josef P. Huser, Lindenhohe, CH-6045 Meggen, Switzerland

[21] Appl. No.: 230,849

[22] Filed: Aug. 10, 1988

[30] Foreign Application Priority Data

Aug. 10, 1987 [CH] Switzerland ........................ 3048/87

[51] Int. Cl.[4] ........................... G01L 5/00; G01L 1/02

[52] U.S. Cl. .............................. 73/862.54; 73/862.58; 33/556

[58] Field of Search ............ 73/862.54, 862.58, 865.9; 33/169 R, 173, 634, 635, 639

[56] References Cited

U.S. PATENT DOCUMENTS 4,546,657 10/1985 Jaeger ............................ 73/862.58

*Primary Examiner*—Charles A. Ruehl

*Attorney, Agent, or Firm*—Thomas W. Speckman; Douglas H. Pauley

[57] ABSTRACT

A process and the device necessary for the measurement of the draw-in force of a tool into the spindle of a machine too. The measuring device has a bolt on which a draw-in nipple is attached at the front. A ring-shaped pressure measuring cell and a centering casing are placed onto the bolt. An axial adjustable stop nut is screwed onto the end of the bolt opposed to the draw-in nipple. For the correct adjustment of the measuring device, so that its draw-in nipple projects into the spindle boring precisely as far as the nipple of the tool holder did previously, a gauge is used which has an adjusting ring and a distance measuring rod and nose piece.

10 Claims, 4 Drawing Sheets

PROCESS AND DEVICE FOR MEASURING THE DRAW-IN FORCE AT THE INTERFACE BETWEEN A TOOL AND THE SPINDLE END OF A MACHINE TOOL

BACKGROUND OF THE INVENTION

This invention relates to a process for measuring the draw-in force at the interface between a tool and the spindle end of a machine tool. The invention also relates to a device for carrying out the process, and to a gauge for adjusting the device. Excessively low draw-in forces of the tool holder in the machine spindle can entail considerable costs. Measurements have shown that the draw-in forces often lie well below the nominal values. This can have serious consequences as a result. Only a sufficient draw-in force permits the complete utilization of the drive force. Large draw-in forces make a large machining capacity possible, while small draw-in forces only permit small feeds and shallow cutting depths.

Sufficiently great draw-in forces are in general particularly important if the tools are stressed radially (laterally).

This is above all the case during milling. During this operation, oscillations (vibrations) arise as a consequence of interrupted cutting. Lateral forces, with simultaneously occurring vibrations, are not conducive to a steep-angle cone connection. The connection loosens, and the tool is "squeezed out".

An insufficient draw-in force has as its consequence the occurrence of vibrations during milling, and can, under certain circumstances, have devastating effects, with fretting corrosion occurring on the steep cone; the boring of the machine spindle can even be damaged.

The draw-in force is determined, in machine tools with an automatic change of tools, by a draw-in device positioned in the spindle. The supplier of the machine specifies the draw-in force which will be produced, by means of a spring or a set of disk plates, for example. When setting up a new machine, it is always advisable to check the prescribed draw-in force before beginning operation. Even later during operation, however, if the work pieces being processed show slight signs of rattling, it is advisable to again further examine the draw-in force. After a certain operating period, it is even possible to carry out this examination on a routine basis. Such a measuring process could not previously be carried out, however, since the means necessary for this were lacking.

SUMMARY OF THE INVENTION

The invention has set as its objective that of providing a measuring process, and of the means necessary for measuring, in the form of a device and a gauge, which permits a simple and reliable measurement of the draw-in force.

The process according to this invention for measuring the draw-in force on the interface between a tool and the spindle end of a machine tool comprises placing a measuring device into a boring of the spindle, the measuring device having an external contour at least approximately corresponding to the external contour of the holding part of the tool and a draw-in element corresponding to the tool which projects into the spindle boring precisely the same distance as the draw-in element of the tool. The inserted measuring device has an axially adjustable stop projecting out from the spindle end. A draw-in device is activated in the spindle pulling inwardly on the draw-in element. The draw-in force between the spindle and the stop on said measuring device is measured by means of a pressure measuring device.

The process is suited both for measuring the draw-in force of tools with conical holding parts, as well as for measuring the draw-in force of tools with cylindrical holding parts.

BRIEF DESCRIPTION OF THE DRAWING

The process will be illustrated in greater detail by means of the attached drawing, and the device and adjusting gauge necessary for the execution of the same are shown in the drawing, wherein.

DESCRIPTION OF PREFERRED EMBODIMENTS

Figure 1:
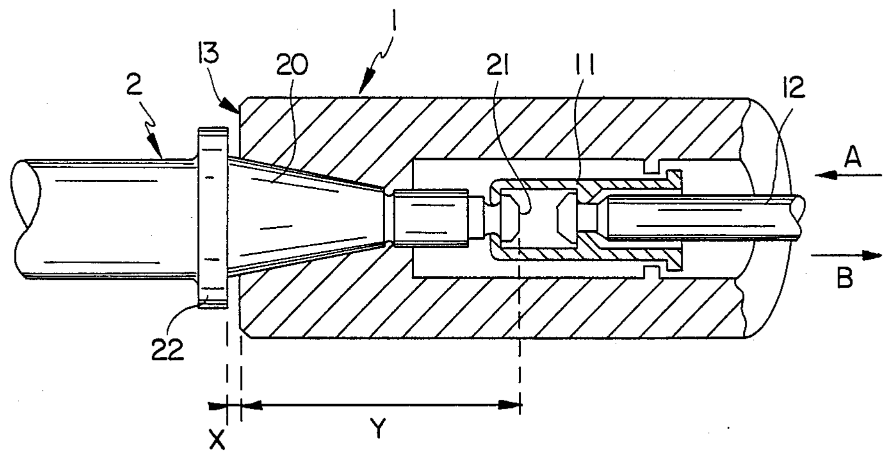
FIG. 1: A cross section of the forward portion of a tool spindle with a tool holder with a steep angle cone used in accordance with DIN 2080 (German Standard) in simplified depiction.

FIG. 1 shows the spindle (1) of a machine tool which is set up for the automatic change of tools. The various tools, such as, for example, a drill, a milling head or a boring tool are thereby connected with a tool holder (2) with a steep angle cone, the tool not being shown in the drawing. All tools which are connected with the same steep angle cone can then be automatically changed. The automatic changing device draws a first tool, along with its steep angle cone, out of the spindle, and places another one with the same steep angle into the spindle boring.

The machine tool thereby brakes the spindle to a standstill, looses the cone previously held, and attaches the newly inserted cone solidly into the boring.

A draw-in device is attached in the spindle by means of the clamp (11). A rod (12) serves to activate the clamp, that is, to open and close it, and to exert the draw-in force. If the rod is moved in the direction of the arrow (A), the slotted casing-shaped clamp opens and releases the draw-in nipple (21) attached to the cone (20).

If the automatic tool changing device has inserted another tool, which is provided with the same cone, the rod (12) moves in the direction of the arrow (B), engages the draw-in nipple, and draws the cone with a certain insertion force into the conical spindle boring, so that the cone lies tightly within the boring.

The draw-in force in the direction of the arrow (B) is exerted, for example, by means of a spring, and the opening of the clamp against the spring force takes place by means of, for example, a hydraulic drive in the direction of the arrow (A).

Figure 2:
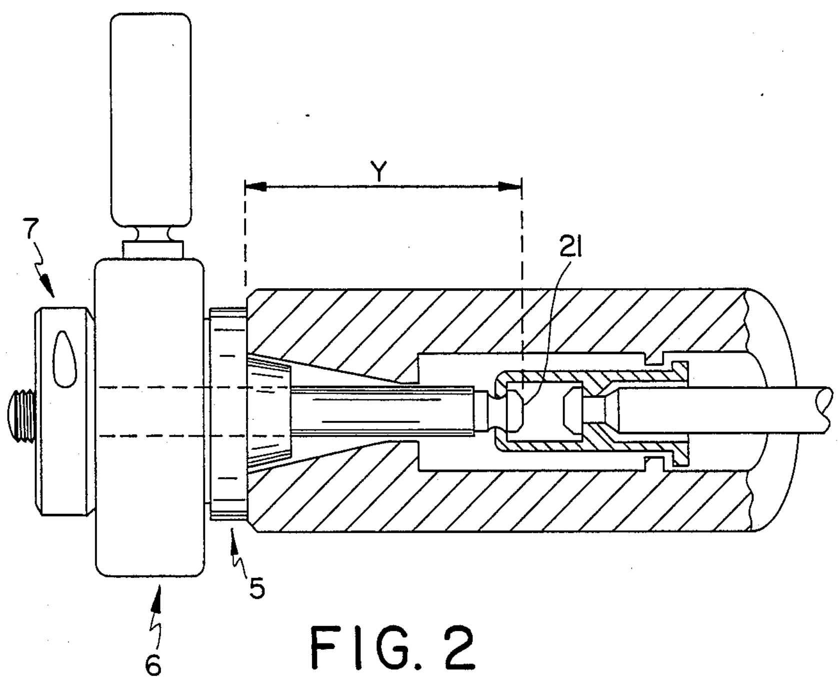
FIG. 2: The same forward part of the tool spindle shown in FIG. 1 with the measuring device during the measuring process.

FIG. 2 shows the same spindle with a measuring device during the measuring of the draw-in force. Before this device itself and the measuring process is described, it should be noted that the draw-in nipple (21), during the measuring, must project precisely as far into the spindle boring as during operation, that is, by the distance (y). On the one hand, the engaging piece collar (22) of the tool holder should and must never lie against the frontal side (13) of the spindle, and it thus has the distance (x) from the spindle head side. On the other hand, however, the draw-in force between the frontal side (13) of the spindle, and a stop (7) attached to the measuring device, must be measured.

Figure 3:
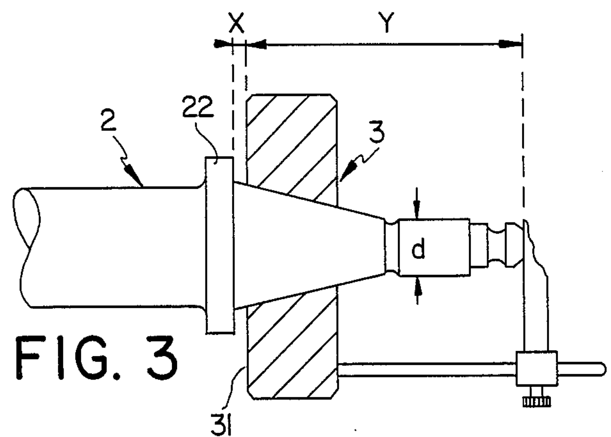
FIG. 3: The tool holder in accordance with FIG. 1 with the adjusting gauge in place.
Figure 4:
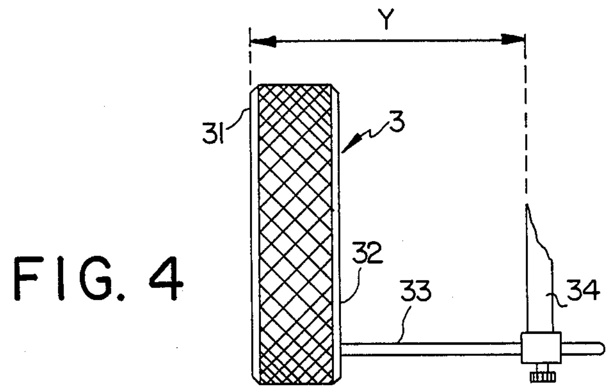
FIG. 4: A side view of the gauge in accordance with FIG. 3.

Before the draw-in force can be measured by the measuring device, it must be adjusted accordingly. The adjustment gauge shown in FIG. 4 serves this purpose. FIG. 3 shows the use of the gauge with the adjustment to the length (y).

The adjustment gauge comprises an adjusting ring (3) with a conical boring, which precisely corresponds to the standardized boring on the head side of the spindle. The face of the lateral surface (31) of the adjusting ring thus precisely corresponds to the position of the head side (13) of the spindle (see FIG. 1). Thus, if the adjusting ring, as is shown in FIG. 3, is placed on the steep angle cone of a tool holder (2), there remains here, as in the operating position in accordance with FIG. 1, a distance (x) between the surface (31) and the engaging piece collar (22) of the tool holder. On the surface (32) of the adjusting ring (3) lying opposite the lateral surface (31), a height-measuring scanner is attached, the rod (33) projects perpendicularly to the surface (32), and a nose unit (34) slides on the bar and is attached in a displaceable manner. When the nose unit (34) is fixed, the important measurement (y) is found.

The bar (33) is held in the adjusting ring (3) in an axially solid manner, but can be swivelled around its central longitudinal axis. This simplifies the adjustment of the measuring device to the distance (y).

Figure 5:
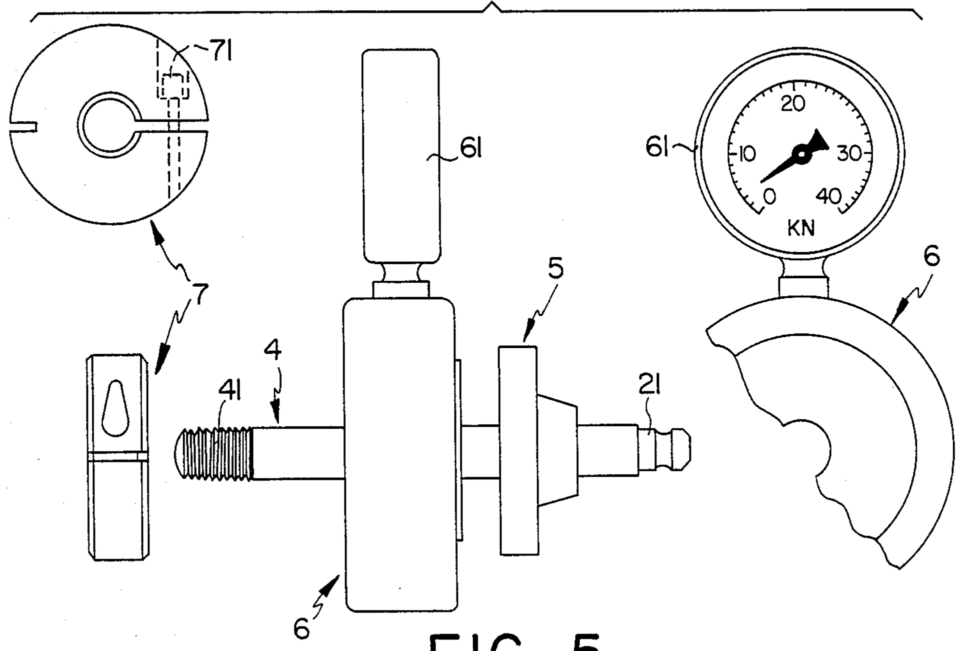
FIG. 5: A side view of the parts of the measuring device.

The measuring device comprises several separate joinable parts which are depicted in Fig. 5, specifically an adjusting bolt (4) on which a draw-in nipple (21) is screwed at one end. The diameter of the adjusting bolt corresponds to the diameter (d) (see FIG. 3) of the cylindrical end on the cone of the tool holder. A catch-centering stop (5) and a ring-shaped hydraulic pressure measuring cell (6) with a manometer (61) are slid up on the bolt. The manometer has a scale calibrated to kN. The bolt (4) is provided with thread (41) on which a nut (7), which forms the axially adjustable stop, can be screwed at the end lying opposite to the draw-in nipple (21). The nut is slotted at one side and can thus, if the device is adjusted to the measurement (y), be fixed on the threads with the help of the fixing screw (71).

If all parts of the measuring device occupy the position shown in FIG. 2, it is then ready for the measurement. During the measurement, the machine is stopped, the clamp (11) is opened, and the final draw-in movement is initiated. The draw-in force can now be simply read off on the manometer. For machines in which the reading is difficult, the manometer can be provided with an indicator pointer.

Figure 6:
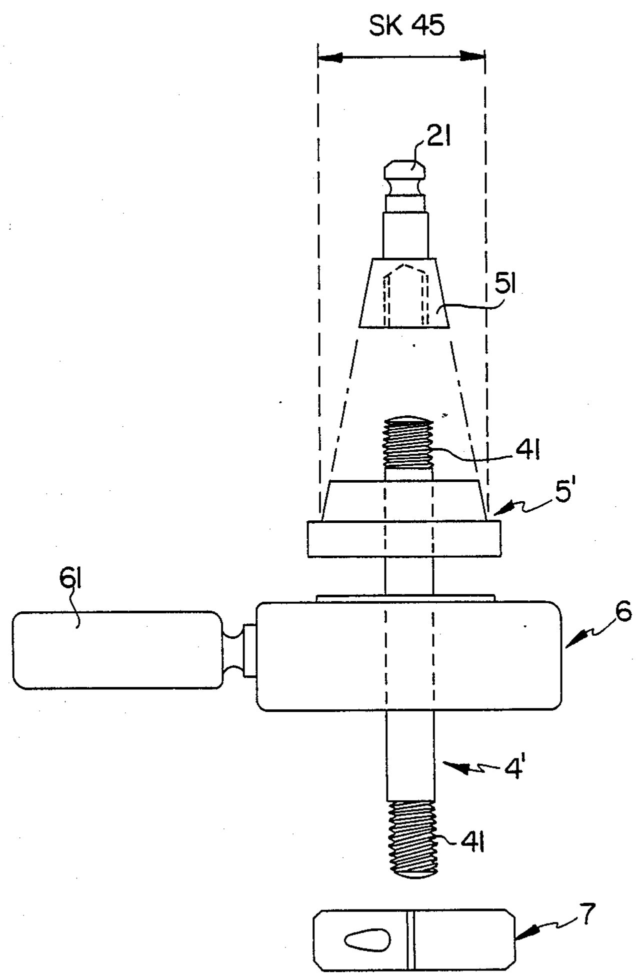
FIG. 6: A side view of the parts of a measuring device for a larger steep angle cone.

FIG. 6 shows one variant of the individual parts of the measuring device. The adjusting bolt (4') has, on both ends, thread (41), and the draw-in nipple is not a part of the bolt, but is rather screwed onto the end by a smaller intermediate part (51). Both this intermediate part (51), as well as the casing (5), are of such a size that they can be inserted into the spindle boring with clearance, so that the measurement will not be impaired.

As is evident from FIG. 6, the primary components of this measuring device are identical with those of the device in accordance with FIG. 5. Only the adjusting bolt (4'), and the parts (5' and 51) serving for the connection, have different dimensions. The parts in accordance with FIG. 5 are suited for measuring the draw-in force of a tool holder with a steep angle cone (SK-30), while the parts in accordance with FIG. 6 are suited for measuring the draw-in force on a tool holder with a larger cone (SK-45). (SK relates to diameter in millimeters at the base of the cone).

In order to adjust the device, another adjusting device with an adjusting ring (3) must naturally be used to match a cone (SK-45).

By means of a few changeable parts, the measuring device can thus be used for the measuring of the draw-in force of tool holders with steep angle cones (SK-30 to SK-50). Also other sizes can be measured by means of this system.

Figure 7:
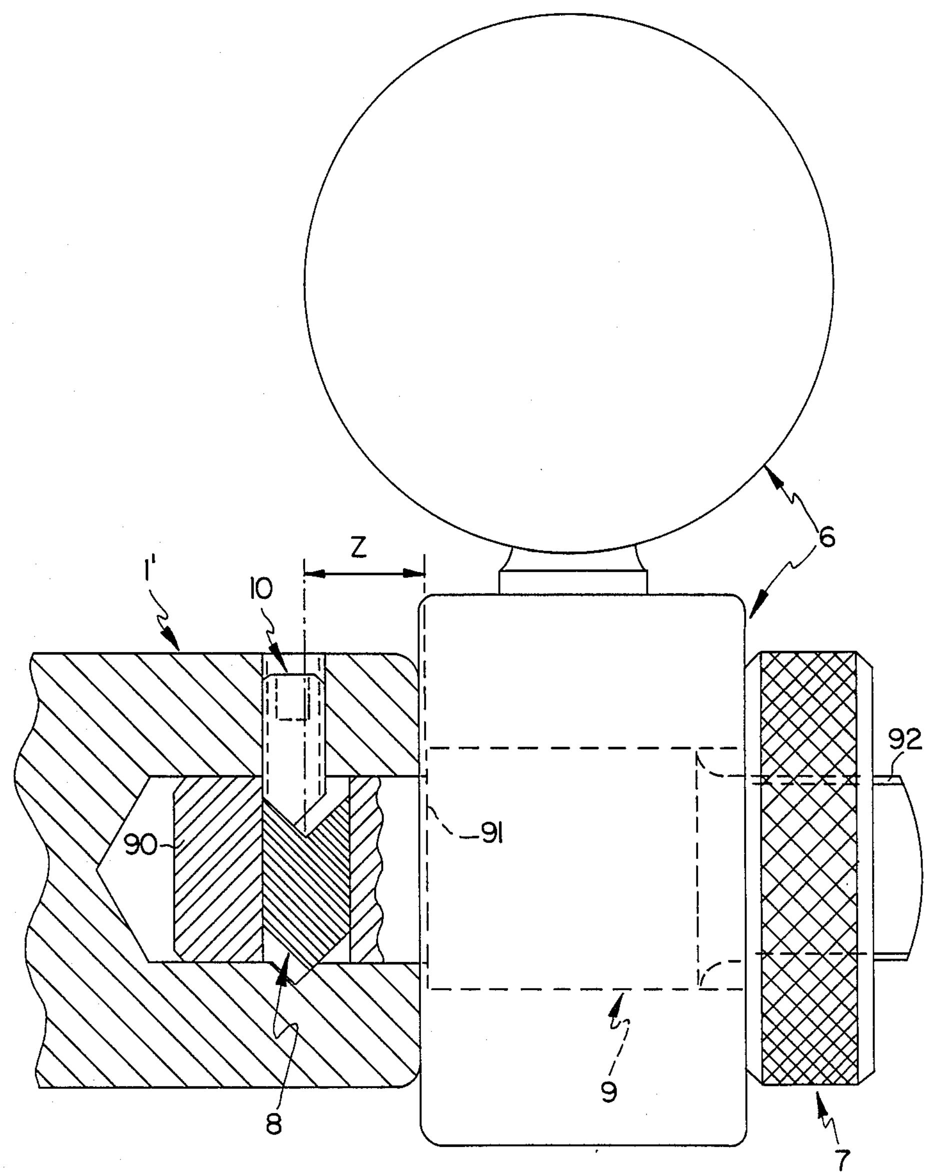
FIG. 7: Shows the forward part of a machine tool spindle with a cylindrical boring, having a measuring device inserted therein, during the measuring process.

FIG. 7 shows the measuring process at a spindle end (1') with a cylindrical boring. In this attachment system, the ring-shaped frontal surfaces and the ring-shaped contact surface of the tool are pressed against one another. This simplifies the preparation work for measuring the draw-in force. For purposes of preparation, there must now only be determined whether the distance (z) between the ring-shaped contact surface of the tool and the center of the draw-in bolt (8) coincides with the distance (z) between the ring-shaped contact surface (91) of the plug (9) of the measuring device and the center of the draw-in bolt. Since standardized precision parts are used, such a checking is generally superfluous. It is undertaken if the measurement of the draw-in force provides unsatisfactory values. The measuring device comprises a plug (9), one end of which has a cylindrical holding part (90), with a draw-in bolt (8) diametrically penetrating it, and a ring-shaped contact surface (91). The dimensions of these parts precisely correspond to those of the holding parts of the tools which can be inserted into the spindle end (1'). The other end of the plug (9) is provided with an external threading (92), on which the nut (7) serving as a lock is screwed on. Between the frontal surface of the spindle end and the nut (7), there is positioned a ring-shaped pressure measuring cell (6) with an indicator device, as previously described. The draw-in bolt (8) is supported in the boring of the holding part in an axially displaceable manner. On the end facing the screw (10), it has an acute-angled depression, and, on the opposing side, it has a point which, during the drawing-in engages into an acute-angled depression in the spindle end. The draw-in bolt (8), together with the screw (10) with the conical tip, together form the draw-in device, the draw-in force of which is to be measured. To measure the draw-in force, the cylindrical holding part (90) of the plug (9) is first of all inserted into the boring of the spindle, and the screw (10) is tightened until the ring-shaped contact surface (91) lies on the frontal side of the spindle end. The screw (10) is thereupon loosened somewhat, until a slight clearance arises between the contact surfaces. For the sake of clarity, the clearance is depicted in an exaggerated manner in the diagram. Now, the measuring device is moved up onto the plug (9), the lock nut (7) is screwed onto the threading (92), and tightened until the measuring cell lies snugly on the frontal surface of the spindle end. In this manner, the preparations for measuring the draw-in force are completed. The screw (10) is now drawn tight with the help of a key unit, and the draw-in force thereby produced is measured.

I claim:

1. A process for measuring the draw-in force on the interface between a tool and the spindle end of a machine tool, comprising: placing a measuring device into a boring of said spindle, said measuring device having an external contour at least approximately corresponding to the external contour of the holding part of said tool and a draw-in element corresponding to said tool which projects into said spindle boring precisely the same distance as the draw-in element of said tool whereby said inserted measuring device having an axially adjustable stop projecting out from the spindle pulling inwardly on said draw-in element; and measuring the draw-in force between the spindle end and said stop on said measuring device by means of a pressure measuring device.

2. A process in accordance with claim 1, in a machine tool with automatic tool changing, in which the holding cone of a tool is drawn into a conical boring of said spindle boring by an automatic gripping device positioned in the spindle, said process comprising: adjusting said stop, prior to inserting said measuring device in said spindle boring, by means of a gauge so that said draw-in element of the measuring device projects precisely as far into said boring as a draw-in element of the tool whereupon said measuring device thus adjusted is inserted into said spindle end.

3. A process in accordance with claim 1 in a machine tool, the spindle end of which is provided with a cylindrical boring, with a draw-in device in the form of a radially positioned screw with conical tip, a draw-in bolt diametrically penetrating the cylindrical holding part of said tool can be displaced, said process comprising: turning said screw only far enough to provide small clearance between said measuring device and said spindle end; tightening the adjustable stop of said measuring device until said pressure measuring device lies snugly against said spindle end; tightening said screw; and measuring the draw-in force thereby attained.

4. A device for measuring the draw-in force on the interface between a tool and the spindle end of a machine tool with automatic tool changing, in which the holding cone of a tool is drawn into a conical spindle boring by an automatic gripping device positioned in the spindle, said measuring device comprising: a bolt (4) having on one end a draw-in element (21) and on the other end an external threading (41), a catch centering casing (5) which can be moved in a sliding manner on said bolt (4), a ring-shaped pressure measuring means (6) which can be placed in a sliding manner onto said bolt (4), and an axial adjustable stop nut (7) which can be screwed onto said threading (41), said measuring means (6) being between said casing (5) and said stop nut (7).

5. A device in accordance with claim 4, wherein said bolt (4) is provided with an external thread (41) on said one end and an intermediate part (51) with said draw-in element (21) is screwed onto said thread on said one end.

6. A device in accordance with claim 4, wherein said axial adjustable stop nut (7) is provided with a fixing element (71).

7. A device in accordance with claim 4, wherein said pressure measuring means (6) is a hydraulic measuring cell with a manometric indicator (61).

8. A device in accordance with claim 7, wherein said manometric indicator device (61) is calibrated in kN, and is provided with a drag pointer indicator.

9. In combination with a device in accordance with claim 4, a gauge for adjusting the device comprising an adjusting ring (3) with a conical boring corresponding to said conical spindle boring on a spindle head end having on the side with the smaller boring diameter of said adjusting ring, a distance measuring means (33, 34) attached.

10. A device for measuring the draw-in force on the interface between a tool and the spindle end of a machine tool which is provided with a cylindrical boring, with a draw-in device in the form of a radially positioned screw with conical tip, a draw-in bolt diametrically penetrating the cylindrical holding part of said tool can be displaced, said device comprising: a plug (9), one end of which is provided with a cylindrical holding part (90) with draw-in bolts (8, 10), said plug, on its other end, has external threading (92) on which an axial adjustable stop nut (7) is screwed on, and a pressure measuring means (6) attached between said spindle end and axial adjustable stop nut (7).

* * * * *